UNITED STATES PATENT OFFICE.

JOHN B. MYERS, OF SHARONVILLE, OHIO.

MEDICAL COMPOUND.

SPECIFICATION forming part of Letters Patent No. 245,010, dated August 2, 1881.

Application filed June 25, 1881. (No specimens.)

*To all whom it may concern:*

Be it known that I, JOHN B. MYERS, a citizen of the United States, residing at Sharonville, Hamilton county, Ohio, have invented new and useful Improvements in Medicinal Compounds, of which the following is a specification.

My composition consists of the following ingredients combined in the proportions stated, to wit: of burnt alum and common salt, mingled in equal bulk, twelve ounces of the mixture; of pure honey, two and a quarter pounds; of ground rhubarb, four ounces; of alcohol, one-half pint; of boiling water, one gallon. These ingredients are to be thoroughly mingled by agitation and allowed to cool and settle, when it should be bottled for use.

The composition is to be used as a medicine for colds and coughs, for which it has proved remedial in a high degree when taken in proper doses, as follows: for a child three months of age, twenty drops; one to three years of age, one tea-spoonful; three to ten years, one and one-half tea-spoonful; and for an adult, a table-spoonful.

I claim and desire to secure by Letters Patent—

The herein-described medicinal compound, consisting of burnt alum, salt, pure honey, rhubarb, alcohol, and water, in the proportions specified.

In testimony whereof I have hereunto set my hand in the presence of two subscribing witnesses.

JOHN B. MYERS.

Witnesses:
C. P. DOOLITTLE,
L. M. HOSEA.